(12) United States Patent
Corbett et al.

(10) Patent No.: US 7,388,497 B1
(45) Date of Patent: Jun. 17, 2008

(54) RADIO FREQUENCY IDENTIFICATION TAG

(75) Inventors: Blaise L. Corbett, King George, VA (US); Michael L. Woodman, Ruther Glen, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 314 days.

(21) Appl. No.: 11/363,296

(22) Filed: Feb. 1, 2006

Related U.S. Application Data

(63) Continuation-in-part of application No. 10/666,823, filed on Sep. 17, 2003, now Pat. No. 7,023,342.

(51) Int. Cl.
*G08B 13/14* (2006.01)

(52) U.S. Cl. .................. 340/572.4; 340/572.1

(58) Field of Classification Search ......... 340/572.1, 340/572.2, 572.4, 572.5, 539.11, 10.1, 10.3, 340/10.4, 10.41, 10.42; 342/42, 44, 51
See application file for complete search history.

(56) References Cited

U.S. PATENT DOCUMENTS

| | | | |
|---|---|---|---|
| 5,381,137 A | 1/1995 | Ghaem et al. ............. 340/572 |
| 5,446,447 A | 8/1995 | Carney et al. ............. 340/542 |
| 5,473,330 A | 12/1995 | Lauro et al. ................ 342/42 |
| 5,488,376 A * | 1/1996 | Hurta et al. ................ 342/42 |
| 5,604,486 A | 2/1997 | Lauro et al. .............. 340/572 |
| 5,686,920 A * | 11/1997 | Hurta et al. ................ 342/42 |
| 5,856,788 A | 1/1999 | Walter et al. .......... 340/825.54 |
| 6,130,602 A * | 10/2000 | O'Toole et al. .......... 340/10.33 |
| 6,265,962 B1 | 7/2001 | Black et al. ............... 340/10.2 |
| 6,452,504 B1 | 9/2002 | Seal .................... 340/825.49 |
| 6,483,426 B1 | 11/2002 | Pagnol et al. ............. 340/10.1 |
| 6,483,427 B1 | 11/2002 | Werb ..................... 340/10.1 |
| 6,590,498 B2 | 7/2003 | Helms .................... 340/572.7 |
| 6,675,476 B2 | 1/2004 | Hostetler .................. 29/890.1 |
| 6,894,614 B2 | 5/2005 | Eckstein et al. .......... 340/572.1 |
| 2002/0149484 A1 | 10/2002 | Carrender ............... 340/572.4 |
| 2004/0132406 A1 | 7/2004 | Scott et al. ................ 455/41.1 |
| 2004/0183742 A1 | 9/2004 | Goff et al. .................. 343/867 |
| 2005/0057368 A1 | 3/2005 | Corbett et al. .......... 340/825.49 |

OTHER PUBLICATIONS

Texas Instruments Inc. "Three Channel LF Receiver (3dAFE) TMS37122", © Dec. 2001.

(Continued)

*Primary Examiner*—Van T. Trieu
(74) *Attorney, Agent, or Firm*—Gerhard W. Thielman, Esq.

(57) ABSTRACT

Radio frequency identification (RFID) includes far-field systems associated with an RFID interrogator and an RFID tag. The RFID interrogator produces continuous wave (CW) unmodulated signals selected from frequencies comprising a predetermined frequency band. The RFID tag includes reception and transmission antenna circuits, a signal processor, and an oscillator. The reception antenna circuit receives the reception signals from the RFID interrogator. The signal processor determines whether the reception signals correspond to a plurality of tag identification frequencies as a correlation. The signal processor also produces responsive signals in response to the correlation. The oscillator supplies a carrier frequency. The transmission antenna circuit combines the carrier signal with the response signals to produce transmit signals, and then dispatches the transmit signals.

19 Claims, 5 Drawing Sheets

OTHER PUBLICATIONS

Sinn, "A DSP Algorithm for frequency analysis", URL: http://www.embedded.com/showArticle.jhtml?articleID=17301593, Jan. 15, 2004.

Banks, "The Goertzel Algorithm", URL: http://www.embedded.com/showArticle.jhtml?articleID=9900722, Aug. 28, 2002.

* cited by examiner

RADIO FREQUENCY IDENTIFICATION TAG

CROSS REFERENCE TO RELATED APPLICATION

The invention is a Continuation-in-Part, claims priority to and incorporates by reference in its entirety U.S. patent application Ser. No. 10/666,823 filed Sep. 17, 2003, now U.S. Pat. No. 7,023,342 titled "Continuous Wave (CW)—Fixed Multiple Frequency Triggered, Radio Frequency Identification (RFID) Tag and System and Method Employing Same" to Blaise L. Corbett and Michael L. Workman, published as U.S. Patent Application Publication 2005/0057368 on Mar. 17, 2005 and assigned Navy Case 84382.

STATEMENT OF GOVERNMENT INTEREST

The invention described herein may be manufactured and used by or for the Government of the United States of America for governmental purposes without the payment of any royalties thereon or therefor.

BACKGROUND

Radio frequency identification (RFID) is becoming an important identification technology in applications such as inventory management, security access, personnel identification, factory automation, automotive toll debiting, and vehicle identification, to name just a few. An RFID system utilizes an RFID transmitter-receiver (interrogation) unit (usually referred to as a base station or interrogator) to query an RFID transponder or tag. When located within an operational distance from the interrogation unit, the RFID tag detects the interrogating signal and transmits a response signal containing encoded data back to the receiver unit.

Current developments in the area of RFID tagging and tracking systems have generally evolved into two distinct technology fields, i.e., near-field devices and far-field devices, the latter generally employing higher frequencies and being operable over longer ranges than the former. Both device types employ some architecture common to both. For example, both types of systems employ an interrogator and at least one transponder tag. The interrogator transmits a query signal to the tag and receives data transmitted from the tag. The architecture of the interrogator generally employs a transmitter/receiver (transceiver) and a reader.

The transceiver may include an antenna and an interface with which to transmit and receive signals to and from the tag. The reader provides the interrogation signal and evaluates the received signals to and from the tag. The reader may include a modulator/demodulator (modem) that communicates with the antenna, a coder/decoder (codec) and a controller for communicating with a processor that handles application-specific functions.

The architecture of each tag generally employs an antenna, a rectifier circuit, and a state machine for modulating the transmitted data. A logic circuit represents one example of a state machine that sequentially transitions through a series of predetermined output states in conjunction with applying to the tag circuitry a series of pulses, such as by a clocking circuit.

Typical RFID tags have a patch antenna, a diode detection trigger to initiate the tag response, and transmission circuitry to send the responding data back to the interrogator. Near-field tags typically employ simpler circuits than far-field tags. Transmission circuitry for the near-field tag usually includes the state machine and a transistor device, the latter being used to change the impedance of the patch antenna.

Most of these near-field RFID systems use a technique called back-scattering. The interrogator for a backscatter system transmits an unmodulated, single frequency continuous wave (CW) signal that triggers or "awakens" the transmitter on the tag. In response, the tag modulates the reflection of the received CW signal by changing the impedance of the antenna in the RFID tag in accordance with a code supplied by a state machine to prevent "collision" of data between two or more tags in close proximity.

The RFID tags in a near-field RFID system may or may not have a battery to provide power for returning a signal to the interrogator. Tags without a battery are labeled "passive", while those with a battery are labeled "active", with simpler tags typically being the former. Passive tags draw power from an electromagnetic field created by the interrogator signal received by the patch antenna. The independent power source for active tags enables longer communication distances, independent sensing and monitoring, self-initiated transmission, and higher bandwidth than passive tags at the sacrifice of higher cost and size.

In contrast, the tags employed in a far-field RFID system have developed around the use of microprocessors and software algorithms. In operation, the interrogator sends a modulated radio frequency (RF) signal to the RFID tag. The microprocessor embedded in the RFID tag interprets the received signal and determines the need for a response signal, i.e., determines whether or not a response signal is warranted.

The far-field RFID system avoids data collision because the tag will respond to the interrogator only when the tag receives a modulated signal that matches a code stored in the tag and accessed by its microprocessor or state machine. If the received signal matches a predetermined code, the tag "awakens" and transmits the requested data via a radio circuit. The encoding and the transmission operations by the tag may be performed by either a microprocessor or a state machine that performs the carrier modulation. These circuits are fairly intricate and thus expensive due to the use of microprocessors. Because of their power requirements, the far-field RFID system frequently employs active tags.

What is needed is a low cost, far-field RFID tagging and tracking system. Desirable characteristics include RFID tagging and tracking system could utilize low cost and/or passive RFID tags without encountering data collision. Such systems would be advantageous if the RFID tagging and tracking system can be utilized in the tracking of inventory and assets for a wide range of applications including, but not limited, to inventory data collection in a warehouse system, tracking of mobile assets, and security monitoring.

SUMMARY

Based on the above and foregoing, there presently exists a need in the art for a far-field radio frequency identification (RFID) tagging and tracking system that overcomes the above-described deficiencies. The devices and techniques described herein overcome the drawbacks and shortcomings of the presently available technology, and thereby fulfill this need in the art.

Various embodiments provide a far-field radio frequency identification (RFID) tag responsive to a plurality of continuous wave (CW) unmodulated signals selected from frequencies including a predetermined frequency band.

In an exemplary embodiment, the RFID tag includes reception and transmission antenna circuits, a signal processor, and an oscillator. The reception antenna circuit receives the reception signals from the RFID interrogator.

The signal processor determines whether the reception signals correspond to a plurality of tag identification frequencies as a correlation. The signal processor also produces responsive signals in response to the correlation. The oscillator supplies a carrier frequency. The transmission antenna circuit combines the carrier signal with the response signals to produce transmit signals, and then dispatches the transmit signals.

Various exemplary embodiments provide for the signal processor to divide the reception signals into constituent frequencies using one of a Goertzel algorithm, an optimized Goertzel algorithm and a Chirp-Z algorithm.

The method for the RFID tag to respond includes steps for receiving the reception signals by a reception antenna circuit, determining whether the reception signals correspond to a plurality of tag identification frequencies as a correlation by a signal processor, producing responsive signals by the signal processor in response to the correlation, supplying to the responsive signals by an oscillator a carrier signal at a carrier frequency, combining the carrier signal with the response signals by a transmission antenna circuit to produce transmit signals, and dispatching the transmit signals by the transmission antenna circuit.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

The far-field radio frequency identification (RFID) tagging and tracking system according to various exemplary embodiments includes low cost RFID tags capable of responding to queries from an RFID interrogator without producing undesirable data collision. This operational characteristic of the RFID tags stems from the fact that only one of the RFID tags will "awaken" and respond to a particular fixed frequency trigger signal generated by the RFID interrogator.

The RFID tagging and tracking system advantageously can be utilized in the tracking of inventory and assets for a wide range of applications including but not limited to inventory data collection in a warehouse system, tracking of mobile assets, e.g., tanks, trucks, etc., and security monitoring of personnel.

In the far-field RFID tagging and tracking system according to various exemplary embodiments, the interrogator may contain many complex components, i.e., microprocessors or control units, for the system. Each RFID tag contains relatively simple logic circuits or a microprocessor utilizing relatively simple routines such as a Goertzel algorithm.

The RFID tagging and tracking system relies on a binary system to prevent data collision between tags in close proximity. More specifically, the RFID interrogator unit transmits multiple, fixed, unmodulated continuous wave (CW) signals over the coverage area. The specific frequencies transmitted by the RFID interrogator are selected from frequencies obtained by dividing the frequency band of into a number of discreet frequency sub-bands. These frequency bands can be selected from several commonly used for RFID systems, including regions in the electromagnetic spectrum that correspond to ultrahigh frequency (UHF) and microwave, e.g., Bluetooth™/IEEE 802.11. Each of the selected frequencies represents a single bit in a multiple bit binary code.

Figure 1:
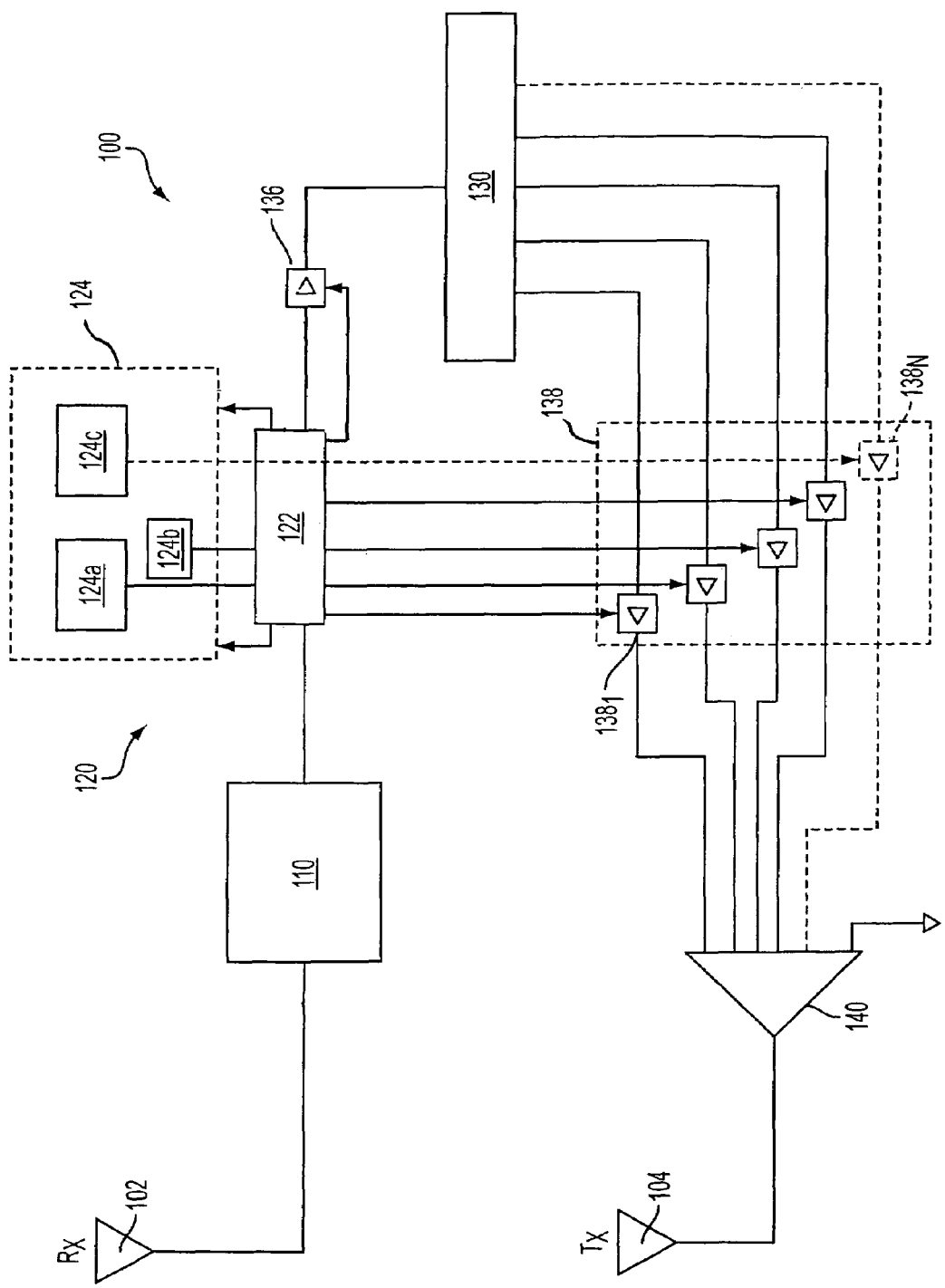
FIG. 1 is block diagram of a preferred embodiment of a frequency identification (RFID) interrogator employed in a far-field RFID tagging and tracking system.

The proposed system is a far-field device. The interrogator 100 contains complex components, such as microprocessors or control units, for the system. FIG. 1 is a block diagram of an RFID interrogator 100 employed in a far-field RFID tagging and tracking system according to various exemplary embodiments. The RFID interrogator 100 includes a pair of antennas 102, 104, for reception and transmission, respectively. The RFID interrogator 100 communicates with the RFID tag through these antennas 102, 104, as described further below.

The transmission antenna 104 submits signals from the interrogator 100 to which the tag corresponding to the transmitted identification responds. The reception antenna 102 provides signals received from the tag, to a receiver front end 110, which advantageously includes demodulators, peak detection filters, etc.

The construction of the receiver front end 110 is well known to one of ordinary skill in the art and will not be described further. A control section 120 receives the signals recovered by the front end 110.

In various exemplary embodiments, the controller 120 may include a controller 122 coupled to a peripheral device 124. The peripheral device 124 may include, in various exemplary embodiments, a data storage device 124a, a user interface display 124b, a master/slave and other control function selector 124c.

The front end 110 may include demodulator and peak detector filters, but is not limited to these components. The front end 110 detects the modulated signals produced from any one of the activated RFID tags with minimal noise interference and provides the extracted information to the control section 220 in an interpretable language, i.e., binary code.

The functions available from the control section 120 are not limited to the enumerated functions. The control section 120 provides control signals to switch 136 and band selector 138 having switches $138_1$ through $138_N$. The switch 136 controls the operation of a multiple frequency generator 130.

The generator 130 produces multiple discrete frequencies within a predetermined frequency band, e.g., the 2.350 GHz to 2.450 GHz microwave frequency band. The frequency band may be selectively applied to the transmission antenna 104 via the switches $138_1$ through $138_N$ and to a frequency summer 140 (for summation).

The control section 120 may provide any number of functions, e.g., a data storage function, a user display function, a master/slave control function, and other such functions desired by the user. The functions provided by the control section may vary depending upon the needs of the user. Moreover, the control section 120 may be a stand-alone or and integrated computer, e.g., a COTS computer.

The switch 136 and its associated control line are optional. This switch 136 may be included in the RFID interrogator 100 to optionally isolate the multiple frequency generator 130 from the control section 120. The control section 120 and switches $138_1$ through $138_N$ may cooperate to select the transmitted frequencies corresponding to the cycled binary code (word) of one of the tags. The switches $138_1$ through $138_N$ in the band selector 138 may be transistor switches. A field effect transistor (FET) represents an example transistor switch.

The multiple frequency generator 130 may provide all the discrete frequencies needed to accomplish the selection task. Moreover, any configuration of components that performs these functions falls within the scope of the RFID tagging and tracking system according to various exemplary embodiments.

The system relies on a binary system to prevent data collision between tags in close proximity. The interrogator 100 sends multiple, fixed, unmodulated CW signals over the coverage area. These frequencies may be selected based on the division of the frequency band of 2.350 GHz through 2.450 GHz into a number of discreet frequency sub-bands.

The control section 120 within the RFID interrogator 100 cycles a binary code that represents a unique identifier for a selected tag. The RFID interrogator 100 then transmits this code in the form of selected CW, unmodulated frequency signals during a tag interrogation stage.

Figure 2A:
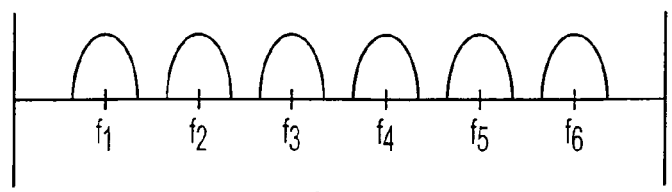
FIGS. 2A, 2B, 2C, and 2D are graphical diagrams for explaining the operation of the far-field RFID tagging and tracking system.
Figure 2B:
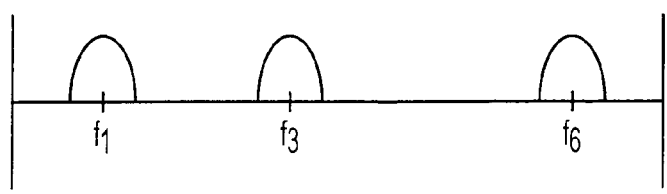
Figure 2C:
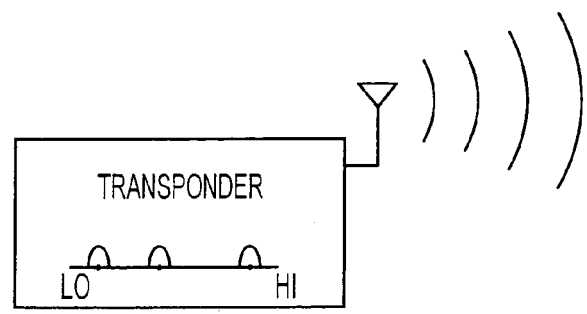

The multiple frequency generator 130 produces N discrete frequencies, as shown in FIG. 2A. Concurrently, the switches $138_1$ through $138_N$ may select discrete frequencies, e.g., $f_1$, $f_3$, and $f_6$ shown in FIG. 2B. These selected frequencies may be combined by the summer 140, and transmitted by the transmission antenna 104, as a binary sequence shown in FIG. 2C.

Figure 2D:
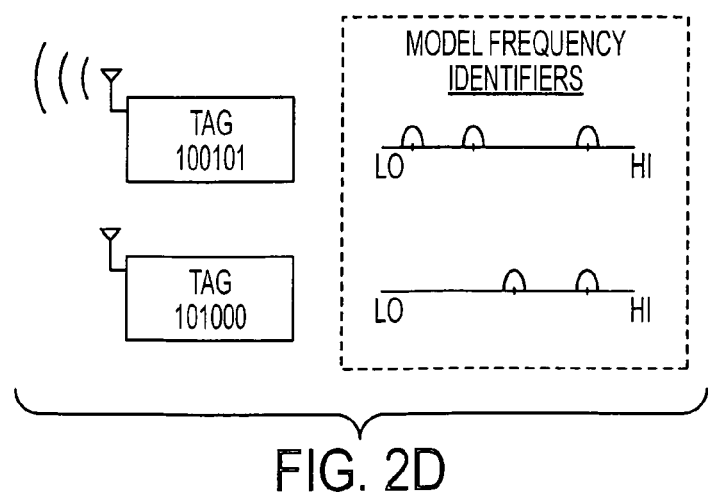

The tag remains dormant for an invalid (i.e., non-corresponding) binary sequence, as shown in FIG. 2D. In contrast, the tag responds to a valid binary sequence that corresponds to the tag's identification, the signal from which may be received by the reception antenna 102.

Figure 3:
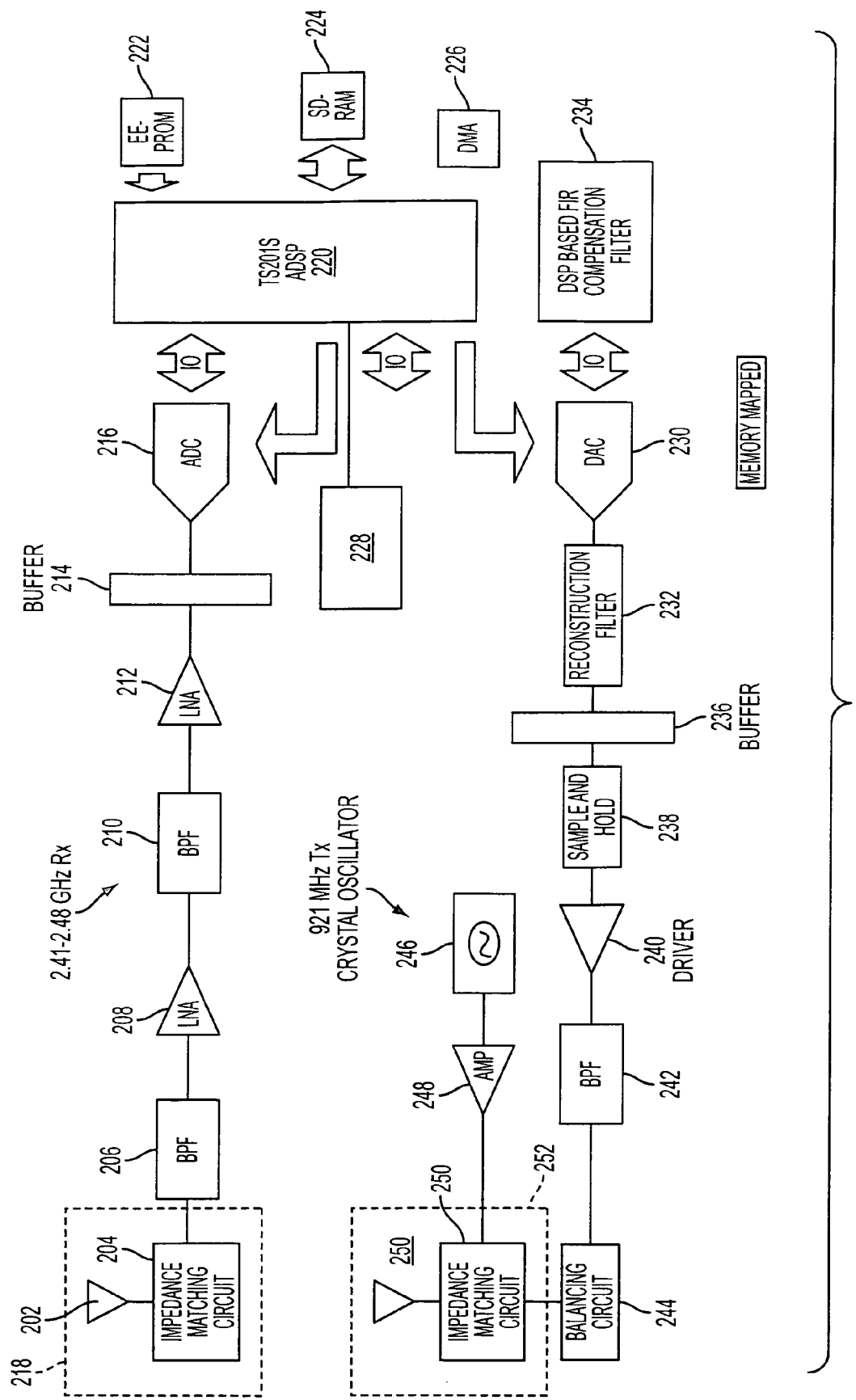
FIG. 3 is a block diagram showing a far-field RFID tag with a digital signal processor and using antenna balancing modulation.
Figure 4:
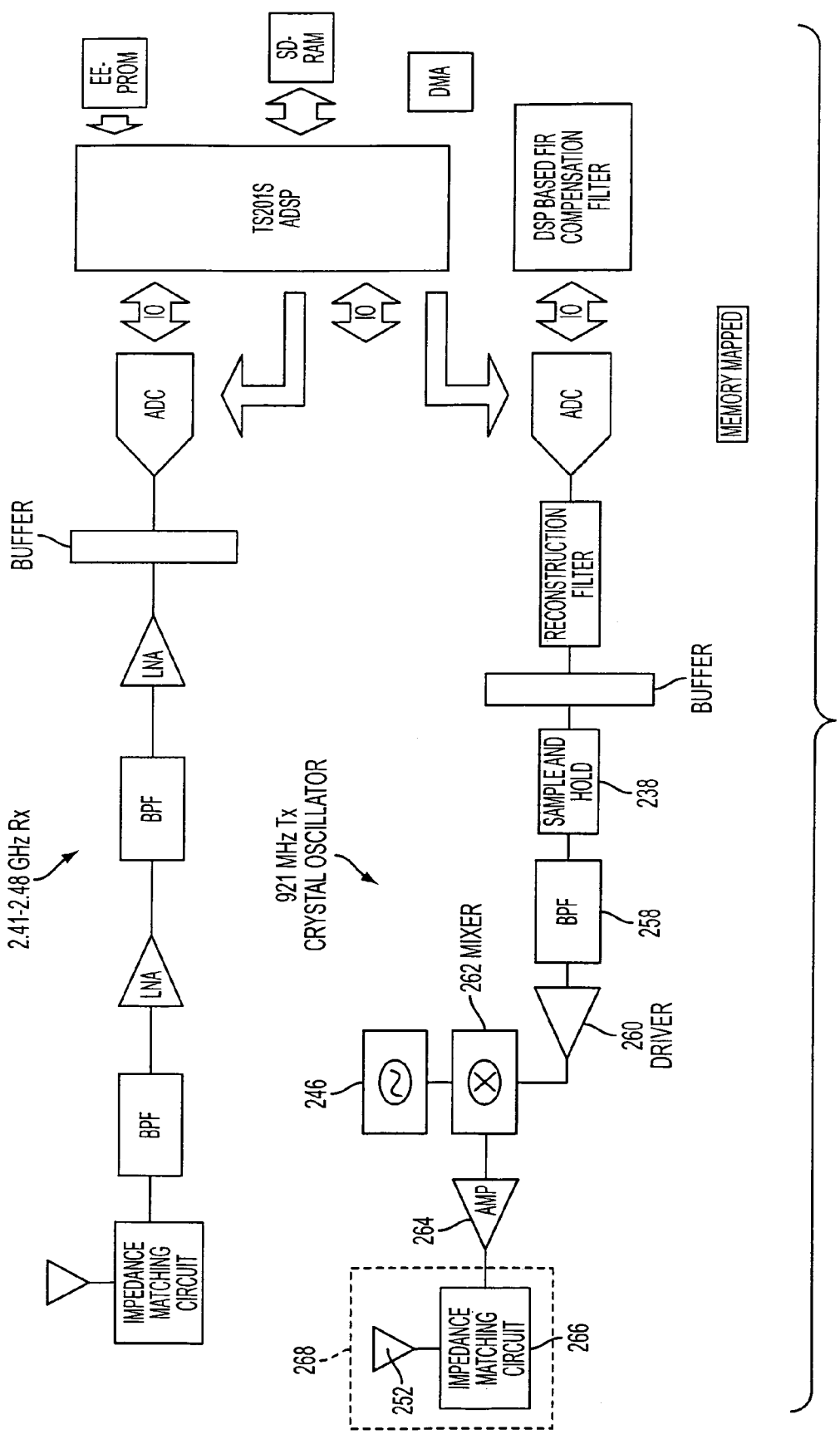
FIG. 4 is a block diagram showing a far-field RFID tag with a digital signal processor and using direct modulation.

FIGS. 3 and 4 illustrate block diagrams of a frequency identification (RFID) tag 200 employed in a far-field RFID tagging and tracking system according to various exemplary embodiments. FIG. 3 shows the tag 200 with a balanced load antenna being used for return signal modulation. FIG. 4 shows the tag 200 using direct modulation.

The functional elements described therein include items available as COTS components, such as an electronically erasable programmable read-only-memory (EEPROM), a synchronized dynamic random access memory (SDRAM) and a direct memory access (DMA). Additionally, various functions may be performed by COTS components that represent available configurations, such as a field programmable gate array (FPGA), an application specific integrated circuit (ASIC), a complex programmable logic device (CPLD) and an arithmetic logic unit (ALU).

The tag 200 in FIG. 3 includes a reception antenna 202 that receives a microwave signal, e.g., at 2.41 GHz through 2.48 GHz from the interrogator 100. The antenna 202 forwards the received signal to a first impedance matching circuit 204 before being successively submitted through a first microwave bandpass filter 206, a first low noise amplifier 208, a second microwave bandpass filter 210, a second low noise amplifier 212, a first buffer 214 and an A/D converter 216 where the signals are converted. The antenna 202 and associated impedance matching circuit 204 may be represented as a reception antenna circuit 218.

Each of the bandpass filters 206, 210 can be a Surface Acoustic Wave (SAW) anti-aliasing filter. The SAW filter may preferably have a center frequency of approximately 2.4375 GHz and −3 dB points at 2.41 GHz and 2.46 GHz. SAW filters can be implemented with relatively steep roll-offs and low loss. Alternatively, the bandpass filters 206, 210 can be designed using widely available COTS components.

The converted digital signals are received in a digital signal processor (DSP) 220. The bypass filters 206, 210 may cover larger bandwidths than typical notch filters because the DSP 220 need only limit bandwidth to widest usable frequency using algorithms to perform more refined filtering.

The DSP 220 may carry an internal clock, such as a 555-timer circuit or a phase-lock-loop. Alternatively, the DSP 220 may employ a pulsed narrow-band frequency (such as 2.440 GHz) from the RFID interrogator 100, applied to a narrow-band filter bank (not shown). A driver voltage can be applied to send signals from the DSP 220 and be generated by any known voltage source suitable for this application.

The DSP 220 communicates with memory components, which may be integral to the DSP 220 or represent peripheral devices. Such memory components include, e.g., an EEPROM 222, an SDRAM 224 and a DMA 226 for storing in memory. The tag 200 may be connected to a separate power source to provide electrical power to the DSP 220. Alternatively, a small power source 228 may reside within the tag 200.

The processed signals from the DSP 220 can be processed by a finite impulse response (FIR) compensation filter 234 provided by the DSP 220. The digital signals are forwarded to a digital-to-analog (D/A) converter 230. The converted analog signals are forwarded to a reconstruction filter 232. The FIR filter 234 provides digital implementation to construct a digital signal for the D/A converter 230 to process, with reconstruction used to attenuate signals out of the band.

The FIR filter 234 lacks feedback, so that the output returns to zero after the number of samples reaches the number of coefficients. In contrast, an infinite impulse response (IIR) filter includes feedback, yielding non-zero values after input of an initial impulse. The IIR filter may require less memory but may be more susceptible to noise than the FIR filter.

The reconstruction filter 232 submits the analog signals to a second buffer 236 to be sequenced by a sample-and-hold (S/H) circuit 238. The S/H circuit 238 creates a spread spectrum signal that can be filtered for applications involving direct signal conversion. The sequenced response signals are then forwarded to a driver amplifier 240 and passed through a UHF bandpass filter 242 and a balancing circuit 244.

A crystal oscillator 246 passes a UHF carrier signal, e.g., 921 MHz, to a carrier amplifier 248. A second impedance matching circuit 250 receives the filtered response signal from the balancing circuit 244 and the amplified carrier signal from the amplifier 248 to produce a combined signal.

The impedance matching circuits 204, 250 may each include an inductor—capacitor (LC) network and an amplifier. A transmission antenna 252 transmits the combined signal to the interrogator 100. The transmission antenna 252 and associated impedance matching circuit 250 may be represented as a transmission antenna circuit 254. As an alternative to the antenna pair 202, 252, a single antenna operable over wider frequency ranges than for the separate functions could serve to receive and transmit signals.

FIG. 4 shows an alternate embodiment of a tag 200. The receiver and processor portions correspond to the configuration shown in FIG. 3. The sequenced response signals forwarded from the sample-and-hold circuit 238 are then forwarded to a UHF bandpass filter 258 and to a driver amplifier 260.

A mixer 262 receives the sequenced response signals from the driver amplifier 260 and the carrier signal from the oscillator 246. The mixer 262 forwards the mixed signal to an impedance matching circuit 266 via a transmission amplifier 264. The transmission antenna 252 passes the resulting signal from the circuit 266 to the interrogator 100. The antenna 252 and associated impedance matching circuit 266 may be represented as a transmission antenna circuit 268.

The A/D converter 216 may be capable of operating at 150 MSPS to ensure proper Nyquist sampling rates for the CW signals in the described embodiment. Typically, higher bit widths are preferred under any circumstance to improve the corresponding signal to noise ratio (SNR). A 16-bit A/D converter is capable of achieving an SNR that exceeds 90 dB, while an 8-bit A/D is capable of approximately 42 dB. An example would be an Analog Devices AD9786 16-bit A/D converter.

An example DSP 220 would be the Analog Devices ADSP-TS201S TigerSHARC processor. The TigerSHARC has embedded RAM, ROM, ALU, an FPGA clock and a 14-channel DMA controller allowing for efficient signal data storage and retrieval. The DSP 220 may include the logic circuit and the state machine for the tag 200 and may be designed from widely available discreet components. Preferably, both the logic (gate) circuit and the state machine can be formed using a single programmable logic device. The logic circuits can be programmed onto a single CPLD or an FPGA, such as those supplied by Xilinx. When the RFID tag design employs a CPLD or an FPGA, the tag 200 can be easily reprogrammed and reconfigured by the user thousands of times.

The signals pass through the microwave filters 206, 210, the amplifiers 208, 212, the A/D converter 216 and the DSP 220. The correct logic sequence triggers the tag 200 to respond by transmitting tag information by modulated carrier between the UHF frequencies of 902 MHz and 928 MHz. Other frequency bands may be used as frequency allocation for an area permits. A clocked state machine within the tag 200, which may be implemented using the DSP 220, may perform the modulation of the data carrier.

The RFID tag 200 may receive microwave signals from the interrogator 100 based on a number of unique identifier codes. That number corresponds to the number of bands into which the allocated frequency range is divided. If the number of divisions is N, the number of unique binary identifiers is one less than the quantity two raised to the power N, i.e., $2^N-1$.

For example, if the allocated frequency is divided into four sub-bands, the number of unique identifiers is $2^4-1=15$. For division into eight sub-bands, the number of unique identifiers is $2^8-1=255$. If there are 15 sub-bands, the number of unique identifiers climbs to $2^{15}-1=32,767$.

As an operating example, the microwave frequency band of 2.350 GHz through 2.450 GHz is divided into eight discreet frequency bands starting at 2.355 GHz and ending at 2.425 GHz, i.e., frequencies $f_1$ through $f_8$. The lowest frequency, in an exemplary case, corresponds to the least significant bit (LSB) of the binary logic code. The number N of frequencies produced by the frequency interrogator's generator 130 is generally constrained by the selectively of the bandpass filters 206, 210 of RFID tags 200.

Figure 5:
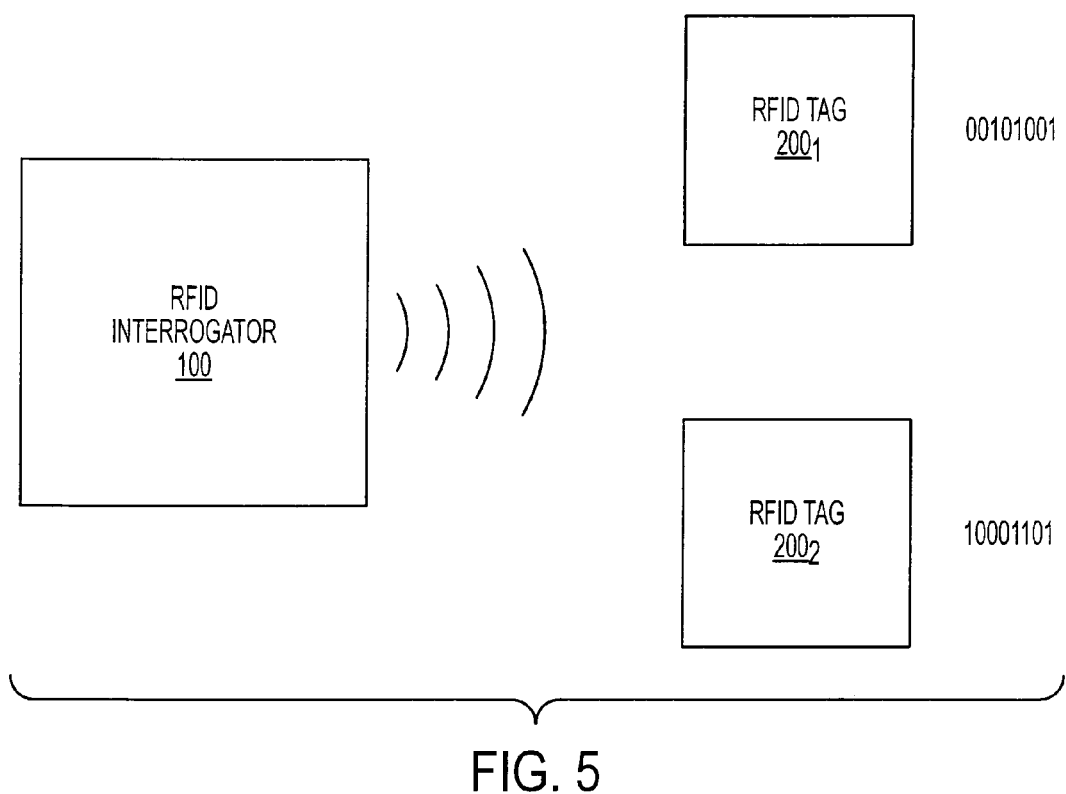
FIG. 5 is a block diagram showing the far-field RFID tagging and tracking system featuring an interrogator and two RFID tags.

The following example, illustrated in FIG. 5 describes two exemplary RFID tags $200_1$ and $200_2$, each with a unique logic code. The first tag $200_1$ has a logic code of 00101001, while the second tag $200_2$ has a logic code of 10001101. Neither tag will respond to a query for a signal transmitted by the RFID interrogator 100 composed of, for example, $f_1$, $f_2$, $f_3$, and $f_4$. In contrast, the second tag $200_2$ responds to a transmitted signal that includes frequencies $f_1$, $f_3$, $f_4$, and $f_8$, while the first tag $200_1$ remains dormant. The first tag $200_1$ responds to a transmitted signal that includes $f_1$, $f_4$, and $f_6$, while the second tag $200_2$ remains dormant.

The RFID tagging and tracking system, when equipped with a directional receive antenna, e.g., a directional reception antenna 102, may be used to locate the equipment or person supporting a particular tag 200. When the system is equipped with three or more receiving antennas, the RFID interrogator 100 can resolve the location of any individual tag 200 in two-dimensional (2D) space. When the system is equipped with four antennas, the RFID interrogator 100 can resolve the location of any individual tag in three-dimensional (3D) space. Multiple front ends 110 would permit real time or near real time determination of a tag's location while multiple antennas 102 selectively coupled to a single front end 110 would permit determination of the tag's position by a multi-step localization process.

Determination of a tag's location would also be possible by operating a single RFID interrogator 100 from multiple locations or from a mobile platform, e.g., from a truck or airplane, to obtain the three or four bearing lines required to resolve the tag's location in 2D or 3D space, respectively.

Each of the selected frequencies represents a single bit in a multiple bit binary code. A control unit within the interrogator cycles a binary code that represents a unique identifier for a tag. This binary code is then transmitted by the interrogator in the form of selected CW, unmodulated frequency signals during the tag interrogation stage. The tag 200 can utilize a single bandpass filter or a series of narrow bandpass filters tuned between the microwave frequencies of 2.350 GHz and 2.450 GHz depending on the capabilities of the DSP 220. Filters 206, 210, 242, 258 can be designed using widely available commercial off-the-shelf (COTS) components.

U.S. patent application Ser. No. 10/666,823 relied on discrete logic components to determine the CW signals and thus the binary identifier being generated by the interrogator. The modified system will rely on the DSP unit to identify the generated signals through the use of a modified discrete Fourier transform (DFT) known as an optimized Goertzel algorithm.

The DFT is a method whereby a computer can determine the frequency and phase components of an energy signal. A DFT evaluates a set number of samples over the sampling period. The number of data samples in turn determines the bin-width of the analyzed signals. By performing a DFT on the sample data, the frequency components emerge as elevated energy signals centered in a particular bin. A similar analysis can be performed to determine signal phase.

The Goertzel algorithm employs a selected block size L that controls the frequency resolution or bin-width. As an example, for sampling rate $r_s=8$ kHz and a block size L=100 samples, the corresponding bin-width is $r_s/L=80$ Hz. The block size L is analogous to the number of points in a fast Fourier transform (FFT). Fortunately, the block size L for the Goertzel algorithm, unlike in the FFT, need not be a power of two, which provides flexibility in adjusting the bin-width.

The Goertzel algorithm computes a signal magnitude using a bin address constant k based on a target frequency $f_t$, the sample rate $r_s$ and the sample block size L from the relation: $k=int[0.5+(Lf_t/r_s)]$, where the function "int" truncates the fractional portion of the bracketed value to a rounded integer value.

For example, if $f_t$=941 Hz, $r_s$=8 kHz and L=205 samples, then k=24. The Goertzel algorithm uses the constant k to determine a phase angle ω from which to calculate a magnitude coefficient c. The phase angle is ω=2πk/L and the coefficient is c=2 cos ω.

The Goertzel algorithm determines the sample signal magnitude by a triple set of state variables $Q_0$, $Q_1$ and $Q_2$. The latter two variables are initialized to zero at the beginning of each block of samples and represent the value of $Q_0$ last time and $Q_0$ two times ago, respectively. For each successive sample S within the block, the Goertzel algorithm sequentially determines first: $Q_0$=c $Q_1$–$Q_2$+S; second: $Q_2$=$Q_1$; and third: $Q_1$=$Q_0$.

The square of the signal magnitude can be determined by the relation: $Z^2=Q_1^2+Q_2^2-c\ Q_1\ Q_2$. The corresponding frequency of the signal can be determined from the magnitude by a threshold comparison. Optionally, the original Goertzel algorithm enables the phase to be determined from the real X and imaginary Y portions of the state variables to be determined as X=$Q_1$–$Q_2$ cos ω and Y=$Q_2$ sin ω, with $Z^2=X^2+Y^2$.

Goertzel algorithms are employed widely in the telecommunication industry to identify dual tone multi-frequency (DTMF) audio signals, such as Touch-Tone® by AT&T. The Goertzel algorithm then outputs the constant k value to a memory location. Another alternative to the DFT and the Goertzel algorithm can be found in the Chirp-Z transform (CZT), which may be used for odd length sequences.

Decoding a DTMF signal involves extracting the two tones in the signal and determining from their value the intended DTMF digit. Tone detection is often done in analog circuits by detecting and counting zero-crossings of the input signal. In digital circuits, tone detection is easier to accomplish by mathematically transforming the input time-domain signal into its frequency-domain equivalent by means of the Fourier transform, or through use of tone-specific digital filters.

The general approach for the Goertzel algorithm for DTMF tone detection takes the Fourier transform of the observed signal and search for energy at the frequencies of interest, because the Goertzel algorithm is implemented by a Discrete Fourier Transform (DFT). The analysis frame must be long enough to resolve the DTMF frequencies, but short enough to detect the minimum length tone. A 12.75 ms frame at a sampling rate of 8 kHz represent reasonable quantities.

The Goertzel algorithm represents a method for calculating any single coefficient of a DFT. The Goertzel algorithm may be considered a second-order IIR filter for each DFT coefficient. In calculating the DFT, the Goertzel algorithm may be preferred over a fast Fourier transform (FFT) algorithm. There are two reasons for this.

First, in order to obtain the required frequency resolution at an 8 kHz sampling rate, a 256-point FFT would be required. Because the algorithm for tone detection requires knowledge of the energy at only 16 frequencies, the Goertzel algorithm is more efficient to execute for these frequencies. Second, the Goertzel algorithm is recursive, eliminating the need to store 256 samples for the FFT for each DTMF detector. This may reduce both time and data memory in the simulation and the real time applications. In a further advantage of the DSP based implementation, the signal resolution over a given bandwidth can be much higher than the implementation using the discrete components.

The Goertzel algorithm is a filter bank implementation that directly calculates one DFT coefficient. Goertzel, being order $N^2$, is not considered a Fast Fourier Transform (FFT), which is order N $\log_2$ (N), where N is the number of subdivided frequency bands. The Goertzel algorithm is a second-order IIR filter that extracts the energy present at a specific frequency.

The Goertzel algorithm is more efficient than an FFT when $\log_2$ (N) or fewer coefficients of the DFT are needed. The Goertzel algorithm is not restricted to allowable sample lengths in base-2, thereby providing an advantage over a conventional DFT. Moreover, the Goertzel algorithm also requires less memory overhead, thereby allowing faster calculation times.

Calculating the DFT at eight frequencies is as efficient in execution time as finding a 256-point FFT. Finding the DFT for sixteen frequencies (the eight DTMF tones and their second harmonics) represents a more complicated process than finding the FFT. However, the filter bank implementation has the tremendous advantage of processing the input data as they arrive. In contrast, the FFT has to wait until the entire sample window has arrived. Therefore, the Goertzel algorithm significantly reduces the data memory required, as well as the time required to collect the L samples.

The Goertzel algorithm can be modified to provide only the frequency components of an energy signal and can thus be made to perform the computation extremely efficiently. The unnecessary phase calculation can be eliminated in an optimized version of the Goertzel algorithm. Signal resolution can be determined by the number of sample points analyzed and the number of frequency bins to be identified.

The DSP 220 may determine the filter bank transfer function, such as by calculation of the described relations. The transfer function for the filter is: $H_k(Z)=(1-W_L^k/Z)/[1-2\cos(2\pi k/L)/Z+1/Z^2]$, where $W_L$=exp(–j2π/L), Z is the input signal and L is the length of the observation window for the DFT based on the L samples. Initially, the state variables of the filter are set to zero. Then, the filter function is executed L times.

The resulting output, $y_k(L)$, is the $k^{th}$ coefficient of a length L DFT. Notice that the filter is implemented as a direct form second-order section. The recursive part of the filter is on the left-hand side of the delay elements, and the nonrecursive part is on the right. Only the output at sample time L is required so that only the nonrecursive part of the filter need be computed after the last iteration of the recursive part. Additionally, only the square of the magnitude of the DFT coefficient is needed, yielding a further simplification.

The nonrecursive calculation of the DFT coefficient is expressed as $y_k(L)=s(L)-W_L^k s(L-1)$ where s(L) and s(L–1) represent the value of the state variables at times L and L–1. The absolute square relation is expressed as $|y_k(L)|^2=|s(L)|^2-2\cos(2\pi k/L)\ s(L)\ s(L-1)+|s(L-1)|^2$. Thus, the value 2 cos(2πk/L) is stored for each coefficient to be evaluated.

The pseudo-code that employs the optimized Goertzel algorithm for a single frequency, provided below in C language, provides an illustrating example. This program is intended only as a guide for establishing processor appropriate code and takes a fixed length array of L data samples starting from a memory location and determines a value "result" at a prescribed frequency location described by the bin address constant k and a sample S. The program then outputs the k value to a memory address.

```
#include <stdio.h>
#include <math.h>
#define    SAMPLE   unsigned int
#define    sample_rate    150000000    // 150 MHz
#define    carrier         50000000    //  50 MHz BW
#define    L              500          //sample length
#define    k              125          //bin address
int far *ptr;
SAMPLE DATA[L];
float cosine, coeff, Q0, Q1, Q2;
void resetgoertzel(void)
{
    Q2= 0;
    Q1= 0;
}
void initgoertzel (void)
{
    float M;
    float omega;
    M= (float)L;
    omega= (2.0*PI*k)/M;
    cosine= cos(omega);
    coeff= 2.0* cosine;
    resetgoertzel( );
}
void processsample(SAMPLE sample)
{
    Q0= coeff*Q1 - Q2 + (float)sample;
    Q2= Q1;
    Q1= Q0;
}
float getmagnitude(void)
{
    float result;
    result= (Q1*Q1) + (Q2*Q2) - (Q1*Q2*coeff);
    return result;
}
int main(void)
{
    float magnitude;
    int index;
    pointer2= (int far*) 0xXXXXXXX //set pointer to mem addx
    pointer1= (int far*) 0xYYYYYYY
    initgoertzel( );
    getvalues(pointer1)   /*appropriate subroutine to access mem addx
    and place these values into the data array DATA[L] */
    for(index= 0; index<L; index++)
    {
        processsample(DATA[index]);
    }
    magnitude= getmagnitude( );
    *pointer2 = magnitude;   //place value in mem addx
    return 0;
}
```

A simple modification to the code in the form of an iterated subroutine will result in the appropriate code for any desired number of frequency bin identifiers. Other DFT codes and algorithms may be employed for this type of data analysis, but these lack the speed and efficiency available with a Goertzel routine or alternatively the CZT routine. Specifically, the CZT calculates the Z-transform on a set of points as the convolution of sampled input. Two FFTs and one inverse FFT can be used to calculate the CZT.

The RFID system as exemplified in the above-described embodiments provides the advantage of a far-field operation combined with an anti-collision system. This anti-collision may be implemented by the characteristics of the CW interrogator signal generated. In contrast to being problematic for conventional systems, multi-path signal interception actually benefits the current proposed system.

For the multi-path signal interception, the digital sampling relies not on the highest frequency to be sampled, a common misunderstanding of the Nyquist criteria, but on the signal bandwidth. This technique is known as signal under-sampling. The consequently fewer parts for the exemplified systems translate into generally lower failure rates and to lower acquisition costs.

Because the proposed RFID system uses a high speed A/D converter 216 and processes using a DSP 220, intermediary mixer components and intermediate frequency (IF) filters are not required. Such devices can introduce signal noise if carelessly implemented.

A device for summing two or more electrical signal includes, in general audio usage, components to process and sum the outputs of two or more microphones or line level sources. Modulation may superimpose a control signal to an electronic or optical signal carrier. In electronic synthesis, one example involves a sine wave output of a low frequency oscillator (LFO) being added to a pitched note that produces vibration.

Another form of synthesis uses the principle of frequency modulation (FM) to generate an entire range of sounds, by modulating the frequency of an audible frequency with the frequency of another signal. Amplitude modulation (AM) and FM radio both employ modulation to broadcast their signals.

Because the proposed system makes use of high-speed digital signal processing components and techniques, the resolution of the identifying CW signals can be optimized based on the DSP capabilities. This optimization has the advantage of allowing a greater number of tag identifiers than the earlier RFID conception. The tag circuit can be developed from relatively low-cost COTS components available from a wide selection of vendors such as Analog Devices Inc. and Texas Instruments Inc.

The RFID tag for this example receives a compound CW signal with microwave frequency components between 2.41 GHz and 2.46 GHz that gives a useable bandwidth of 50 MHz. The tag 200 may transmit a modulated UHF carrier signal between the frequencies of 902 MHz and 928 MHz. Modulation for the example may be implemented using the balancing circuit 244 on the transmission antenna circuit 254, 268.

For example, the interrogator 100 may generate eight separate microwave frequency signals at 2.420, 2.425, 2.430, 2.435, 2.440, 2.445, 2.450 and 2.455 GHz. The interrogator 100 receives the modulated signal from the RFID transponder. The interrogator 100 may include any number of common signal transmitter components and need only be capable of transmitting and rotating through the CW signals and receiving amplitude modulated (AM) signals at the designated frequencies.

A data sample width L of 500 data points provides a frequency bin-width of 100 kHz. Other values can be used, and this is just a notional representation. Additionally, the input signal could be broken into smaller sub-bands for simultaneous processing based on the capabilities of the DSP used.

The interrogator 100 broadcasts a compound microwave signal composed, for example, of 2.42 GHz, 2.43 GHz, 2.44 GHz, and 2.45 GHz CW signals. These frequencies correspond to the exemplary binary identifier of 01010101. All active RFID tags 200 in monitoring mode gather the CW signal data to analyze.

At the RFID tags 200, the signals pass through the antenna circuit 254 tuned for 2.41 GHz to 2.46 GHz. The signals pass through the anti-aliasing filter and are amplified by the low noise amplifiers 208, 212. The signals are then sampled by the A/D converter 216. The sampling provides a direct signal down-conversion of the signal for the DSP 220, which routes the data from the A/D converter 216 directly to the on-board RAM 222.

The modified Goertzel algorithm is retrieved from ROM 220 and the data are processed to determine which CW signal frequencies are present. This can be done via a single routine or through an indexed subroutine using the Goertzel algorithm. The bin values are determined and compared to corresponding identifier values stored in the ROM 220. This comparison can be performed through a direct threshold comparison or through a signal convolution.

Upon determining that the identifier code stored in ROM 220 matches the decoded CW signal, the tag 200 will activate the 920 MHz crystal oscillator 246. Concurrently, the tag 200 balances and unbalances the antenna circuit 254 through the balancing circuit 244 to modulate a return data signal. Upon sending the signal, the RFID tag 200 will deactivate the oscillator 246 and continue to monitor the interrogator signals.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A far-field radio frequency identification (RFID) tag responsive to a plurality of continuous wave (CW) unmodulated reception signals selected from frequencies comprising a predetermined frequency band, the RFID tag comprising:
    a reception antenna circuit for receiving the reception signals;
    a signal processor for determining whether the reception signals correspond to a plurality of tag identification frequencies as a correlation, and producing responsive signals in response to the correlation;
    an oscillator for supplying a carrier signal at a carrier frequency; and
    a transmission antenna circuit for combining the carrier signal with the response signals to produce transmit signals, and dispatching the transmit signals.

2. The RFID tag according to claim 1, wherein the signal processor determines whether the reception signals correspond to the tag identification frequencies by dividing the reception signals into constituent frequencies using a Goertzel algorithm.

3. The RFID tag according to claim 1, wherein the signal processor determines whether the reception signals correspond to the tag identification frequencies by dividing the reception signals into constituent frequencies using an optimized Goertzel algorithm.

4. The RFID tag according to claim 1, wherein the signal processor determines whether the reception signals correspond to the tag identification frequencies by dividing the reception signals into constituent frequencies using a Chirp-Z algorithm.

5. The RFID tag according to claim 1, wherein the signal processor includes at least one of a power source, a read-only-memory (ROM), a random-access-memory (RAM) and a direct memory access (DMA).

6. The RFID tag according to claim 1, further comprising:
    an analog-to-digital converter (ADC) for converting the CW signals to digital signals; and
    a digital-to-analog converter (DAC) for converting the digital response signals to analog signals, wherein the signal processor is a digital signal processor (DSP).

7. The RFID tag according to claim 1, wherein the reception antenna circuit operates in the microwave frequency range.

8. The RFID tag according to claim 1, wherein the oscillator and the transmission antenna operate in the UHF range.

9. A far-field radio frequency identification (RFID) tag responsive to a plurality of continuous wave (CW) unmodulated reception signals selected from frequencies comprising a predetermined frequency band, the RFID tag comprising:
    a reception antenna circuit for receiving the CW reception signals;
    an analog-to-digital converter (ADC) for converting the CW reception signals to digital reception signals;
    a digital signal processor (DSP) for determining whether the reception signals correspond to a plurality of tag identification frequencies as a correlation, and producing digital responsive signals in response to the correlation;
    a digital-to-analog converter (DAC) for converting the digital responsive signals to analog responsive signals;
    an oscillator circuit for supplying a carrier signal at a carrier frequency; and
    a transmission antenna circuit for combining the carrier signal with the analog responsive signals to produce transmit signals, and dispatching the transmit signals.

10. The RFID tag according to claim 9, wherein:
    the transmission antenna circuit comprises a transmission antenna, an impedance matching circuit, and a balancing circuit,
    the balancing circuit receives the analog receptive signals to produce balance signals, and
    the impedance matching circuit transmits to the transmission antenna the balance signals from the balancing circuit and the carrier signals from the oscillator circuit.

11. The RFID tag according to claim 9, wherein the oscillator circuit comprises an oscillator and a mixer, the mixer separately receives the carrier signal from the oscillator and the responsive analog signals, and the mixer submits the transmit signals to the transmission antenna circuit.

12. The RFID tag according to claim 9, wherein the reception antenna circuit further includes a bandpass filter, a low pass amplifier and a buffer.

13. The RFID tag according to claim 9, wherein the transmission antenna circuit further includes a reconstruction circuit, a buffer, a sample-and-hold circuit, an amplifier and a bandpass filter.

14. The RFID tag according to claim 9, wherein the DSP communicates with a finite impulse response (FIR) filter.

15. The RFID tag according to claim 9, wherein the signal processor determines whether the reception signals correspond to the tag identification frequencies by dividing the reception signals into constituent frequencies using one of a Goertzel algorithm, an optimized Goertzel algorithm and a Chirp-Z algorithm.

16. A method for responding to a plurality of continuous wave (CW) unmodulated reception signals by a far-field radio frequency identification (RFID) tag, the reception signals being selected from frequencies within a predetermined frequency band, the method comprising:
    receiving the reception signals by a reception antenna circuit;

determining whether the reception signals correspond to a plurality of tag identification frequencies as a correlation by a signal processor;
producing responsive signals by the signal processor in response to the correlation;
supplying to the responsive signals by an oscillator a carrier signal at a carrier frequency;
combining the carrier signal with the response signals by a transmission antenna circuit to produce transmit signals; and
dispatching the transmit signals by the transmission antenna circuit.

17. The method according to claim 16, further comprising:
converting the CW reception signals to digital reception signals by an analog-to-digital converter (ADC), wherein the reception signals are digital reception signals, and the responsive signals are digital responsive signals; and
converting the digital responsive signals to analog responsive signals by a digital-to-analog converter (DAC).

18. The method according to claim 16, wherein supplying a carrier signal further includes reconstructing the analog responsive signals.

19. The method according to claim 16, wherein determining whether the reception signals correspond further includes dividing the reception signals into constituent frequencies using one of a Goertzel algorithm, an optimized Goertzel algorithm and a Chirp-Z algorithm.

* * * * *

UNITED STATES PATENT AND TRADEMARK OFFICE
CERTIFICATE OF CORRECTION

| | |
|---|---|
| PATENT NO. | : 7,388,497 B1 |
| APPLICATION NO. | : 11/363296 |
| DATED | : June 17, 2008 |
| INVENTOR(S) | : Blaise L. Corbett and Michael L. Workman |

It is certified that error appears in the above-identified patent and that said Letters Patent is hereby corrected as shown below:

Title Page Item (75) identifying the inventors, please replace "Michael L. Woodman" with --Michael L. Workman--.

Signed and Sealed this

Twelfth Day of August, 2008

JON W. DUDAS
*Director of the United States Patent and Trademark Office*